United States Patent Office 2,750,403
Patented June 12, 1956

2,750,403

PROCESS FOR REMOVING FERROUS ION IMPURITY IN THE PREPARATION OF DICYANOBUTENE

William H. Calkins, Victoria, Tex., assignor to E. I. du Pont de Nemours and Company, Wilmington, Del., a corporation of Delaware No Drawing. Application May 13, 1952,
Serial No. 287,603

6 Claims. (Cl. 260—465.8)

This invention relates to an improved process for manufacturing dicyanobutene by reaction between dichlorobutene and hydrogen cyanide.

Recently, highly efficient methods have been disclosed for the preparation of 1,4-dicyano-2-butene by cyanation of dichlorobutenes in the presence of copper-containing catalysts in aqueous acidic media (Webb and Tabet USP 2,477,672; cf. also Whitman 2,477,674, Johnson and Whitman 2,477,617, Calkins 2,557,258). The manufacture of nylon intermediates is now carried out on a very large scale by the use of the aforesaid method. During many months of operation of this process, including recycling the catalyst in the aqueous phase, difficulties were encountered which were characterized by: (1) polymer formation in the reactors, (2) polymer formation in the recycled catalyst solution, (3) loss of activity of catalyst and (4) build up of iron in the recycle streams. While despite these difficulties the process has been highly efficient, it has been desirable to eliminate the said difficulties and thereby provide still further improvements in the said process.

The difficulties hereinabove disclosed have been shown to be associated with the presence of small amounts of iron which accumulate in the aqueous phase. The problem which has arisen therefore was to provide a method for removing such iron from the cyanation recycle catalyst stream. This iron, it has been found, is present in the stream in the form of ferrocyanide ion.

An object of this invention is to provide improvements in the process for preparing dicyanobutene by eliminating the difficulties hereinabove described.

It has been discovered in accordance with this invention that the aforesaid difficulties can be eliminated by interposing in the cyanation process a step for removal of ferrous iron from the catalyst recycle stream. The present invention is therefore directed to a process for removal of ferrous iron from a liquid aqueous copper-containing phase contaminated with ferrous iron, produced in the manufacture of 1,4-dicyano-2-butene by reaction between dichlorobutene and hydrogen cyanide in a liquid aqueous acidic medium containing a dissolved cuprous compound as catalyst, which comprises subjecting the constituents of the said aqueous phase to the action of a cation of the class consisting of $Cu^{++}$, $Cd^{++}$, $Mn^{++}$, and $Fe^{+++}$, maintaining the temperature of the resulting mixture at 0° to 100° C., preferably 25° to 60° C. and at a pH in the range of 4.0 to 6.0 whereby a precipitate containing ferrous iron is produced and thereafter separating the said precipitate from the resulting mixture. The cations which are employed in the practice of this invention can be produced by introducing appropriate salts yielding the desired cations, suitable salts being ferric chloride, cupric chloride, cadmium chloride, manganese chloride ($MnCl_2$), and other such water-soluble salts producing such cations.

The present invention can be better understood by reference to the following observations. The difficulties sought to be overcome by the process of the invention were not readily apparent from laboratory scale operations, in which no effort was made to exclude oxygen, and which were continued for relatively short periods of time so that the build up of ferrous iron in the system was not appreciable. However, when the process was carried out on the plant scale under such conditions that air was excluded for long periods of time, the difficulties hereinabove described became fairly serious. It was discovered, however, that when air was injected into the aqueous recycle catalyst for the cyanation, the solution remained relatively clean and polymer-free. It was also discovered that when small amounts of ferric chloride were introduced and the resulting ferric ferrocyanide was removed, the difficulties also disappeared. However, it was further discovered that the treatment with air did not oxidize the ferrous iron to ferric iron. Experiments with other cations, added to the aqueous catalyst phase led to the discovery that a class of cations capable of producing insoluble ferrocyanides was capable of producing the desired improvement. This indicated that the deleterious component of the reaction mixture was the ferrocyanide ion; moreover, it was discovered that the ferrocyanide ion was capable of forming a complex with dicyanobutene and was indeed capable of producing the undesirable effects which had been observed in prolonged operation of the process in the absence of air. The chief source of the ferrocyanide was found to be the sodium cyanide which was used to produce hydrogen cyanide in situ; it was discovered that the purest available sodium cyanide contained from 20 to 200 parts per million of iron as ferrocyanide.

In accordance with the foregoing, the present invention is directed to a method for avoiding the formation of undesirable products in the manufacture of 1,4-dicyano-2-butene by including in the process a step whereby the accumulation of traces of ferrocyanide is avoided.

The invention is further illustrated by means of the following example.

EXAMPLE

A catalyst solution comprising 8 gms. of copper as cuprous chloride was charged into a cyanation reactor along with enough water to make up a volume of about 300 ml. The mixture was heated to a temperature of 80–85° C. and hydrochloric acid was added to reduce the pH to 5.0. A 200 gm. charge of dichlorobutene was added at the rate of about 10 ml. per minute. Sodium cyanide containing a trace of ferrocyanide was added at a rate which was controlled so as to maintain the pH at 5.0, HCl being added also at a rate sufficient to neutralize the small amount of sodium carbonate alkalinity present in the sodium cyanide feed. During the addition of the reactants the mixture was continuously agitated. These conditions were repeated a series of times to test the effect of adding various cations to the aqueous phase. In testing the effect of the cations at the end of each cyanation cycle, the agitator was turned off and the product was allowed to separate into two layers. By examining the interface in strong light, the presence or absence of a filmy polymer in the interface could be detected. The nature of this filmy polymer appeared to be the same as that of the polymer which accumulated in the economical process during prolonged operation in the absence of air. The quality of the product therefore could be judged by the presence or absence of the polymer in the interface. It could also be judged in part by its color. A product was considered to be good if it was yellow to amber in color and contained no polymer. A product was considered poor if it was dark in color and contained polymer. After inspection, the product in each instance was extracted with 200–300 ml. of benzene, the oil layer was washed once with water and the water wash was combined with the reactor water layer. The combined aqueous layers were analyzed for copper and iron and then treated with the cation producing agent (e. g. 6.6% ferric chloride aqueous solution) with agitation in the quantities hereinbelow indicated. The resulting precipitate of Prussian Blue was removed by filtration and the treated solution was extracted four times with 200 ml. portions of purified benzene to remove dicyanobutene which had been present in the form of complexes present in the aqueous phase. The pH of the resulting aqueous layer was lowered to 1.7 by addition of hydrochloric acid, and a slurry containing cuprous copper was thereby precipitated. This was removed and concentrated to make a slurry containing 10% solids. Fresh cuprous cyanide was added to the slurry to make up for process and handling losses. Aqueous sodium cyanide solution was then added to the slurry to dissolve the catalyst; for this purpose 3 mols of sodium cyanide were used per mol of cuprous copper. The resulting solution was ready for use as catalyst solution in the next cycle in the manner hereinabove described. In a series of such experiments it was found that ferric ion gave the most satisfactory results as the added cation. Excellent results also were obtained with cupric ion, cadmium ion, manganese ion ($Mn^{++}$).

The quantity of the catalytic compound which was introduced in the foregoing tests was determined by the quantity of ferrous iron which was found to be present. For example, a reaction mixture containing 100 parts per million of ferrous iron would stoichiometrically require 133 parts of ferric ion for formation of the precipitate. It is not to be understood, however, that by the use of approximately stoichiometrical quantities the final iron concentration could be reduced to 0 part per million. It was, however, reduced to a relatively low value which remained substantially constant and which was not high enough to give rise to the difficulties which had otherwise occurred.

The following table of data obtained in accordance with the illustrative example hereinabove given show the effect of addition of ferric chloride under various conditions on the iron content of the aqueous phase.

TABLE I

*Effect of conditions on Prussian Blue precipitation*

[Raffinate, initial iron conc. 156 p. p. m.]

| pH | Temperature | Iron in Filtrate |
|---|---|---|
| 5.7 | 60 | 89 |
| 5.0 | 60 | 34 |
| 5.7 | 25 | 65 |

*Ferric chloride treatment at 60° C. and pH 5.0*

| Initial Iron Concentration | Final Iron Concentration |
|---|---|
| 156 | 34 |
| 140 | 30 |
| 176 | 35 |

TABLE II

*Effect of excess ferric chloride on iron removal at pH 5.7*

[Raffinate, initial iron conc. 156 p. p. m.]

| Percent Excess $FeCl_3$ | Temperature | Final Iron Concentration |
|---|---|---|
| 0 | 60 | 89 |
| 100 | 60 | 113 |
| 0 | 25 | 65 |
| 25 | 25 | 54 |
| 100 | 25 | 45 |

The beneficial effect of the process of this invention has been demonstrated by continuing the recycling process described in the example hereinabove given through 21 cycles. The product in these recycle experiments remained light in color and free of polymer. Control experiments clearly demonstrated that polymer could not be avoided without including the iron removal step. In the control series, polymer formation could be observed in the 12th cycle and continued to form in 4 additional cycles.

As above indicated the process of this invention is highly useful and valuable in the synthesis of 1,4-dicyano-2-butene, which is an intermediate in the manufacturing of nylon type resins.

I claim:

1. A process for removing ferrous iron from a liquid aqueous copper-containing phase contaminated with ferrous iron produced in the manufacture of 1,4-dicyano-2-butene by reaction between dichlorobutene and hydrogen cyanide in a liquid aqueous acidic medium containing a dissolved cuprous compound as catalyst which comprises subjecting the constituents of the said aqueous phase to the action of an added cation of the class consisting of $Cu^{++}$, $Cd^{++}$, $Mn^{++}$, and $Fe^{+++}$, maintaining the temperature of the resulting mixture at 0° to 100° C. and at a pH of 4.0 to 6.5 whereby a precipitate containing ferrous iron is produced and thereafter separating the said precipitate from the resulting mixture.

2. Process of claim 1, in which the said cation is introduced as ferric chloride.

3. Process of claim 1, in which the said cation is introduced as cupric chloride.

4. Process of claim 1, in which the said cation is introduced as cadmium chloride.

5. Process of claim 1, in which the said cation is introduced as $MnCl_2$.

6. A process for removing ferrous iron from a liquid aqueous copper-containing phase contaminated with ferrous iron produced in the manufacture of 1,4-dicyano-2-butene by reaction between dichlorobutene and hydrogen cyanide in a liquid aqueous acidic medium containing a dissolved cuprous compound as catalyst which comprises introducing ferric chloride into the said aqueous phase, maintaining the temperature of the resulting mixture at 25 to 60° C. and the pH at 4.0 to 6.5 whereby a precipitate containing ferrous iron is produced, thereafter separating the said precipitate from the resulting mixture, lowering the pH of the resulting aqueous phase to about 1.7 whereby a slurry of copper-containing compound is produced, concentrating the said slurry by removal of liquid component therefrom, dissolving the concentrated slurry in aqueous sodium cyanide and recycling the resulting liquid aqueous copper-containing solution to a reaction vessel wherein it is employed as aqueous catalyst-containing phase in the reaction between hydrogen cyanide and dichlorobutene to produce 1,4-dicyano-2-butene.

References Cited in the file of this patent

UNITED STATES PATENTS

| 1,938,469 | Sulman et al. | Dec. 5, 1933 |
| 2,049,358 | Dangelmajer | July 28, 1936 |
| 2,187,108 | Barrett | Jan. 16, 1940 |
| 2,477,617 | Johnson et al. | Aug. 2, 1949 |
| 2,477,674 | Whitman | Aug. 2, 1949 |